(12) United States Patent
Nagata

(10) Patent No.: US 7,296,118 B2
(45) Date of Patent: *Nov. 13, 2007

(54) STORAGE DEVICE AND INFORMATION MANAGEMENT SYSTEM

(75) Inventor: Koji Nagata, Kaisei (JP)

(73) Assignee: Hitachi, Ltd., Tokyo (JP)

( * ) Notice: Subject to any disclaimer, the term of this patent is extended or adjusted under 35 U.S.C. 154(b) by 318 days.

This patent is subject to a terminal disclaimer.

(21) Appl. No.: 11/039,815

(22) Filed: Jan. 24, 2005

(65) Prior Publication Data

US 2005/0210193 A1 Sep. 22, 2005

Related U.S. Application Data

(63) Continuation of application No. 10/851,085, filed on May 24, 2004, now Pat. No. 7,127,578.

(30) Foreign Application Priority Data

Mar. 22, 2004 (JP) .............................. 2004-083120

(51) Int. Cl.
*G06F 12/00* (2006.01)

(52) U.S. Cl. ...................... 711/114; 711/162; 711/165; 711/161

(58) Field of Classification Search ...................... None
See application file for complete search history.

(56) References Cited

U.S. PATENT DOCUMENTS

| | | | |
|---|---|---|---|
| 5,790,773 A | 8/1998 | DeKoning et al. | |
| 5,835,953 A | 11/1998 | Ohran | |
| 6,038,639 A | 3/2000 | O'Brien et al. | |
| 6,434,681 B1 | 8/2002 | Armangau | |
| 6,484,186 B1 | 11/2002 | Rungta | |
| 6,643,671 B2 | 11/2003 | Milillo et al. | |
| 6,694,413 B1 | 2/2004 | Mimatsu et al. | |
| 6,748,504 B2 | 6/2004 | Sawdon et al. | |
| 6,771,843 B1 | 8/2004 | Huber et al. | |
| 2003/0065901 A1 | 4/2003 | Krishnamurthy | |
| 2003/0101321 A1 | 5/2003 | Ohran | |
| 2003/0131193 A1 | 7/2003 | Kodama et al. | |
| 2003/0131278 A1 | 7/2003 | Fujibayashi | |
| 2003/0221077 A1* | 11/2003 | Ohno et al. | 711/165 |
| 2003/0229656 A1 | 12/2003 | Hitz et al. | |
| 2004/0186900 A1* | 9/2004 | Nakano et al. | 709/213 |

* cited by examiner

*Primary Examiner*—Reginald Bragdon
*Assistant Examiner*—Horace L. Flournoy
(74) *Attorney, Agent, or Firm*—Mattingly, Stanger, Malur & Brundidge, P.C.

(57) ABSTRACT

Using a snapshot function, a remote copy is efficiently created. Data for a snapshot is converted into a first bitmap of differential data for a remote copy. The conversion is performed in advance at appropriate chronological intervals. Furthermore, when the snapshot function splits, a second bitmap of cascade differential data, which is new differential data, is created simultaneously with creation of the data for the snapshot. This second bitmap of cascade differential data is created in the same format as the first bitmap of differential data for the remote copy. Then, when the snapshot function shifts from split status to pair status, the second bitmap of cascade differential data is added to the first bitmap of differential data for the remote copy (to produce a logical sum), and a remote copy is created based on this bitmap that was added.

2 Claims, 8 Drawing Sheets

FIG.7A

SNAPSHOT DIFFERENTIAL DATA
FOLLOWING DATA EACH 64 KB

BACK UP COPY DIFFERENTIAL DATA
FOLLOWING DATA EACH 1 MB

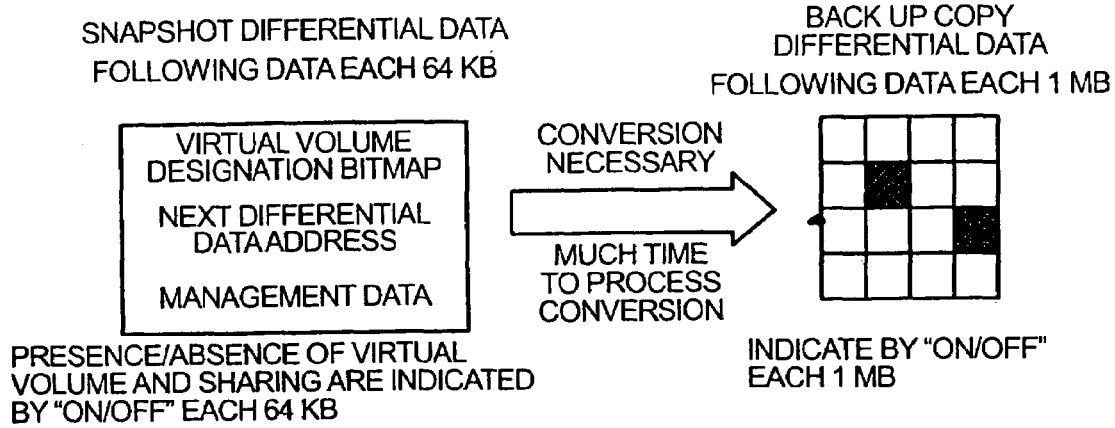

CONVERSION NECESSARY

MUCH TIME TO PROCESS CONVERSION

PRESENCE/ABSENCE OF VIRTUAL VOLUME AND SHARING ARE INDICATED BY "ON/OFF" EACH 64 KB

INDICATE BY "ON/OFF" EACH 1 MB

FIG.7B

WHEN SNAPSHOT FUNCTION IS SPLIT

SNAPSHOT DIFFERENTIAL DATA
FOLLOWING DATA EACH 64 KB

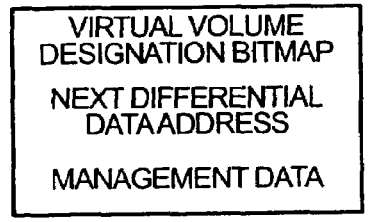

NEW DIFFERENTIAL DATA
CASCADE DIFFERENTIAL DATA
FOLLOWING DATA EACH 1 MB

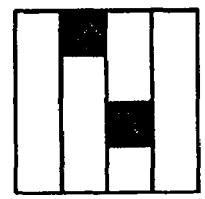

SAME FORMAT AS BUFFER COPY DIFFERENTIAL DATA

SET BOTH DURING HOST I/O

FIG.7C

WHEN SNAPSHOT FUNCTION IS SHIFTED FROM SPLIT TO PAIRED

NEW DIFFERENTIAL DATA
CASCADE DIFFERENTIAL DATA
FOLLOWING DATA EACH 1 MB

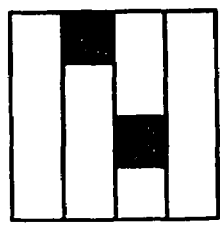

ADD

BACK UP COPY DIFFERENTIAL DATA
FOLLOWING DATA EACH 1 MB

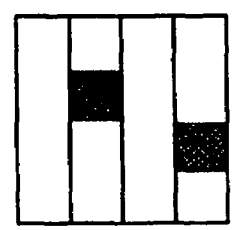

INDICATE BY "ON/OFF" EACH 1 MB

SAME FORMAT AS BUFFER COPY DIFFERENTIAL DATA

ADD CASCADE DIFFERENTIAL DATA TO BUFFER COPY DIFFERENTIAL DATA ("OR" PROCESSING)

STORAGE DEVICE AND INFORMATION MANAGEMENT SYSTEM

CROSS-REFERENCES TO RELATED APPLICATIONS

This application is a continuation of U.S. application Ser. No. 10/851,085, filed May 24, 2004, now U.S. Pat. No. 7,127,578, the entire disclosure of which is incorporated by reference herein.

This application relates to and claims priority from Japanese Patent Application No. 2004-083120, filed on Mar. 22, 2004, the entire disclosure of which is incorporated by reference herein.

BACKGROUND OF THE INVENTION

The present invention relates to a storage device and information management system of the type used to prepare a remote copy of data that is created on a host computer, for example, and is written into the storage device; and, more particularly, the invention relates to a storage device having a so-called snapshot function, which is arranged such that a preferable remote copy is created.

A method has been proposed in which a storage device having a so-called snapshot function saves multiple generations of data on a plurality of storage devices, so that, when a breakdown occurs, the saved data is used to perform data restoration smoothly. (For example, see JP 2003-242011 A.)

However, in the above-mentioned JP 2003-242011 A, there is no description whatsoever about means disclosed by the present invention for effectively utilizing the snapshot function to create a remote copy efficiently as provided by the present invention.

When creating a remote copy in a conventional storage device, for example, a next volume is formed for storing the same data as a storage area (primary volume) of which the remote copy will be made, and then the remote copy is created from the next volume. However, with this method, in the formation of the next volume, it is necessary for the next volume to have the same storage capacity as the primary volume, and thus an extremely massive storage capacity is required.

On the other hand, in a storage device having the so-called snapshot function, when data is read and written to and from the primary volume, the data that was stored there previously is saved into a storage area called a pool area, and the relationship between this saved data and the original primary volume is stored in the memory as a virtual volume. Accordingly, multiple generations of data, that are stored one after the other, can be saved using little storage capacity.

Therefore, in a storage device having this type of snapshot function, when creating a remote copy, the remote copy can be updated based on the virtual volume in the memory. Namely, in the above-mentioned virtual volume, there are descriptions relating to the data that was read and written, and the descriptions are referenced to rewrite the remote copy, whereby the remote copy can be updated.

However, the above-mentioned virtual volume saves indications as to whether or not snapshots exist every 64 KB, for example, which is the unit of data processing by the host computer, along with addresses, so that it is not possible to know which data the snapshot is actually present in. Therefore, in a case where a remote copy is to be made from this virtual volume, it necessary to generate a map showing the presence/absence of the snapshots, however, generating this map requires much time.

In other words, when a storage device having the above-mentioned snapshot function creates a remote copy, the remote copy can be updated based on the virtual volume in the memory; however, in order to do this, it is necessary to create a map showing the presence/absence of the snapshots. Since it takes time to generate this map, it was not possible to create the remote copy in an overall efficient manner.

SUMMARY OF THE INVENTION

The present invention has been made in light of the above-mentioned considerations. Problems to be solved by the present invention include the problem that, when creating a remote copy in a storage device having a snapshot function, the conventional device was not able to create the remote copy in an overall efficient manner.

In order to resolve the above-mentioned problems, the present invention employs a first means for using a snapshot management table to generate a virtual logical volume and for using the virtual logical volume to create the remote copy. Furthermore, when updating the virtual logical volume, a first bitmap showing an area where a differential has occurred with respect to the remote copy is created, and then, when writing the snapshot differential data, a second bitmap showing the area of the differential data is created.

Accordingly, although the conventional device does not enable efficient overall remote copying when creating a remote copy in a storage device having the snapshot function, in accordance with the present invention, a first bitmap and a second bitmap are created, and these bitmaps are used to create a remote copy efficiently, therefore solving the previously existing problems.

BRIEF DESCRIPTION OF THE DRAWINGS

FIGS. 7A to 7C are diagrams of processing for adding bitmaps according to the present invention.

DESCRIPTION OF THE PREFERRED EMBODIMENTS

Figure 1:
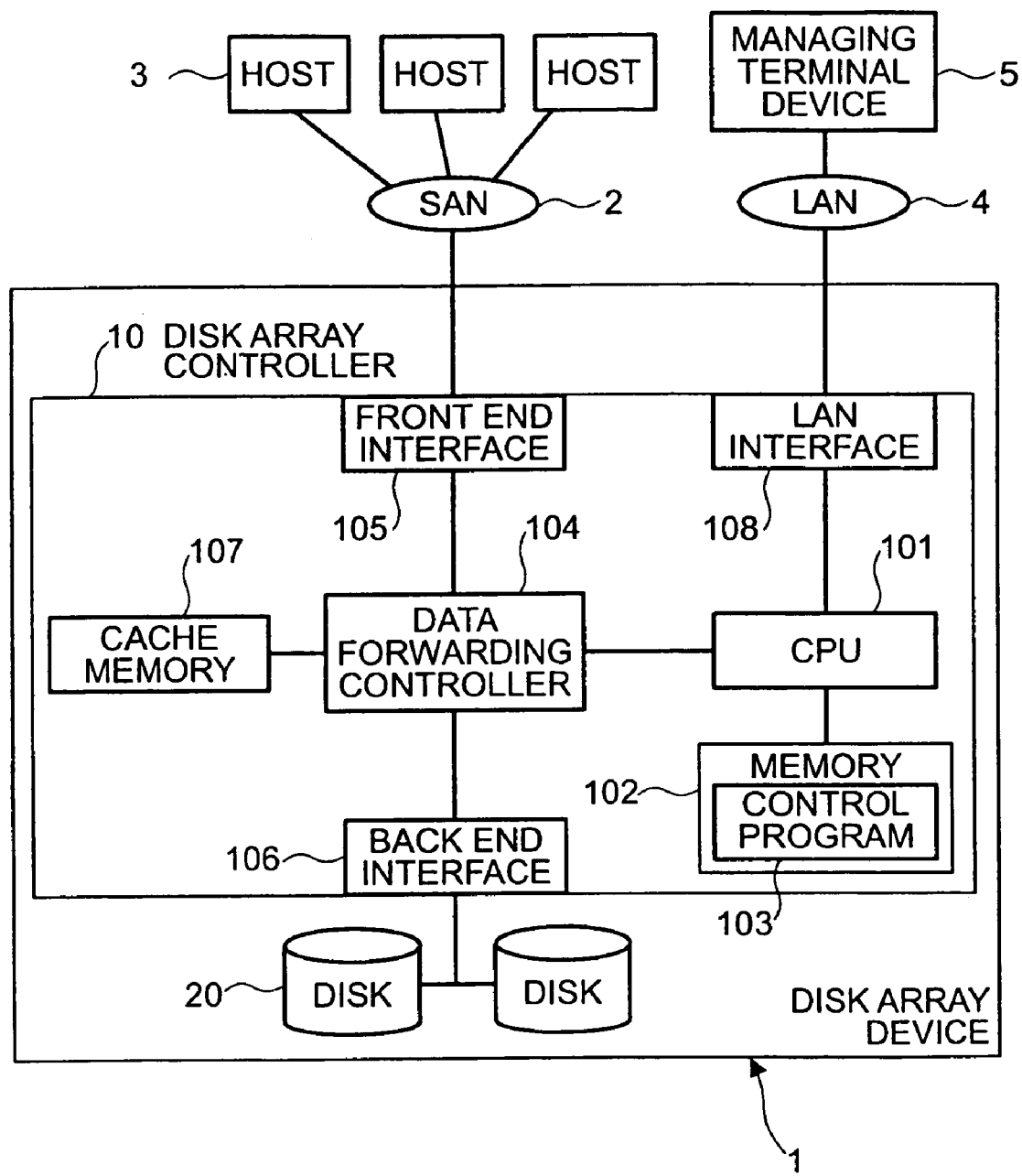
FIG. 1 is a block diagram of a disk array device according to an embodiment of the present invention.

The present invention will be explained with reference to the drawings. FIG. 1 is a block diagram depicting the construction of an embodiment of a disk array device employing a storage device in accordance with the present invention, and an information management system of the present invention using such a disk array device.

In FIG. 1, a disk array device 1 according to of the present invention includes a disk array controller 10 and a disk 20. Furthermore, the disk array device 1 is connected to a plurality of hosts 3 via a SAN (Storage Area Network) 2, and to a management terminal device 5 via a LAN (Local Area Network) 4.

The disk array controller 10 uses operations of a control program 103 to control the input/output of data to and from the disk 20. Furthermore, the disk 20 constitutes a RAID (Redundant Array of Independent Disks), whereby stored data becomes redundant. Therefore, even if a portion of the disk becomes damaged, the stored data will not be lost.

Furthermore, the disk array controller 10 is provided with a CPU 101, a memory 102, a data forwarding controller (a data transferring controller) 104, a front end interface 105, a back end interface 106, a cache memory 107, and a LAN interface 108.

The control program 103 (see FIG. 2) is stored in the memory 102, and the CPU 101 calls up and executes the control program 103, whereby various processing is performed. The data forwarding controller 104 forwards data between the CPU 101, the front end interface 105, the back end interface 106, and the cache memory 107.

The front end interface 105 is an interface to the SAN 2, and it may use fiber channel protocol, for example, to send and receive data and control signals to and from the host 3. The back end interface 106 is an interface to the disk 20, and it may use fiber channel protocol, for example, to send and receive data and control signals to and from the disk 20.

The cache memory 107 is a cache for temporarily storing data sent/received between the front end interface 105 and the back end interface 106. Data which is to be read and written to and from the disk is forwarded between the interfaces 105, 106 by the data forwarding controller 104 via a SAN 4. Furthermore, the data which is to be read and written to and from the disk is forwarded to the cache memory 107.

The LAN interface 108 is an interface to the LAN 4, and it uses TCP/IP protocol, for example, to send and receive data and control signals to and from the management terminal device 5. The SAN 2 is a network enabling communications in a protocol that is suitable for forwarding data, such as the fiber channel protocol.

Each host 3 is a computer device which has a CPU, a memory, a storage device, an interface, an input device and a display device. Data provided from the disk array device 1 can be utilized to enable usage of a database service, a web service, etc. The LAN 4 is used to manage the disk array device 1. Thus, TCP/IP protocol, for example, enables communication of data and control information to and from the computer, and Ethernet® may be used, for example.

The management terminal device 5 is a computer device which has a CPU, a memory, a storage device, an interface, an input device and a display device. In the management terminal device 5, a management program operates. The management program monitors the operation status of the disk array device 1 and controls the operations of the disk array device 1.

Note that a web browser and other client programs operate on the management terminal device 5. Also, the operations of the disk array device 1 may be controlled by the management program supplied from the disk array device 1 through a CGI (Common Gateway Interface) or the like.

Figure 2:
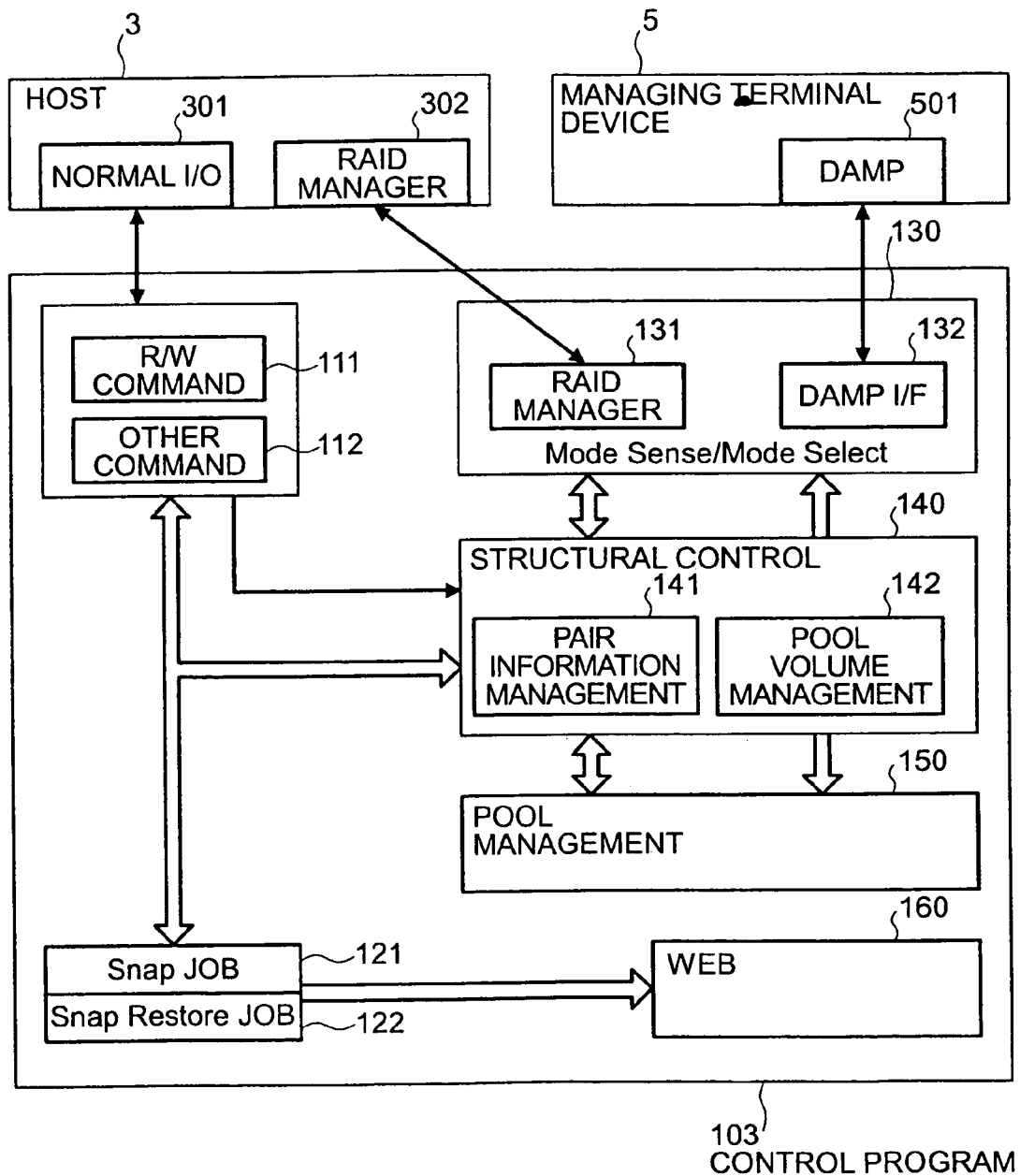
FIG. 2 is a diagram of a control program according to the present invention.

FIG. 2 is a diagram showing one example of the above-mentioned control program 103, in the above-mentioned disk array device and information management system using the disk array device.

In FIG. 2, a data input/output request sent from a normal I/O processing program 301 in the host 3 is interpreted by an R/W command interpreting program 111 of the control program 103 in the disk array device 1 and then is sent to a snap job program 121. When the snap job program 121 receives a request to write data to the primary volume, un-updated data in the primary volume at the time when the data is to be written to the primary volume is replicated in a pool volume storage area. After the replication occurs, the content of the primary volume is updated.

Furthermore, the snap job program 121 updates a snapshot management table (DDCB (Differential Data Control Block) 204), so as to establish correspondence between the virtual volume block corresponding to the primary volume block whose data was updated and the pool volume block storing the data that was in the primary volume at the time when the snap job request was received (i.e., the un-updated data).

Furthermore, a snap restore job program 122 performs processing to restore the snapshot from next to primary.

In this way, it becomes possible for the disk array device 1 to provide a snapshot image. Then, the host 3 uses the normal I/O processing program 301 to access the virtual volume, whereby the information that was in the primary volume at the time when the snapshot generation request was issued can be used.

Furthermore, the control command sent from the normal I/O processing program 301 is also interpreted by a command interpreting program 112, and then it is sent to a structural information control program 140. When a pair information management program 141 of the structural information control program 140 receives the snapshot generation request, first, identification information for a new virtual volume is registered in the snapshot management table. A correspondence is established in a one-to-one fashion with this virtual volume block, first by means of the snapshot management table.

As described below, a pool volume management program 142 manages addition and deletion of a volume registered in the pool area. A pool management program 150 performs management of the pool itself, in accordance with the pool volume management program 142. Furthermore, a WEB program 160 serves to open the job on the WEB.

Furthermore, a RAID manager program 131 provided in the control program 103 of the disk array device 1 is connected so as to be able to communicate with a RAID manager program 302 of the host 3. The RAID manager programs 131, 302 enable generation of the snapshot, generation of the remote copy, alteration of pair status, etc.

Furthermore, a DAMP interface program 122 is connected so as to be able to communicate with a DAMP program 501 in the management terminal device. The DAMP interface program 122 performs communications with the DAMP program 501 in the management terminal device 5, thus enabling management of the configuration of the RAID in the disk array device 1.

Figure 3:
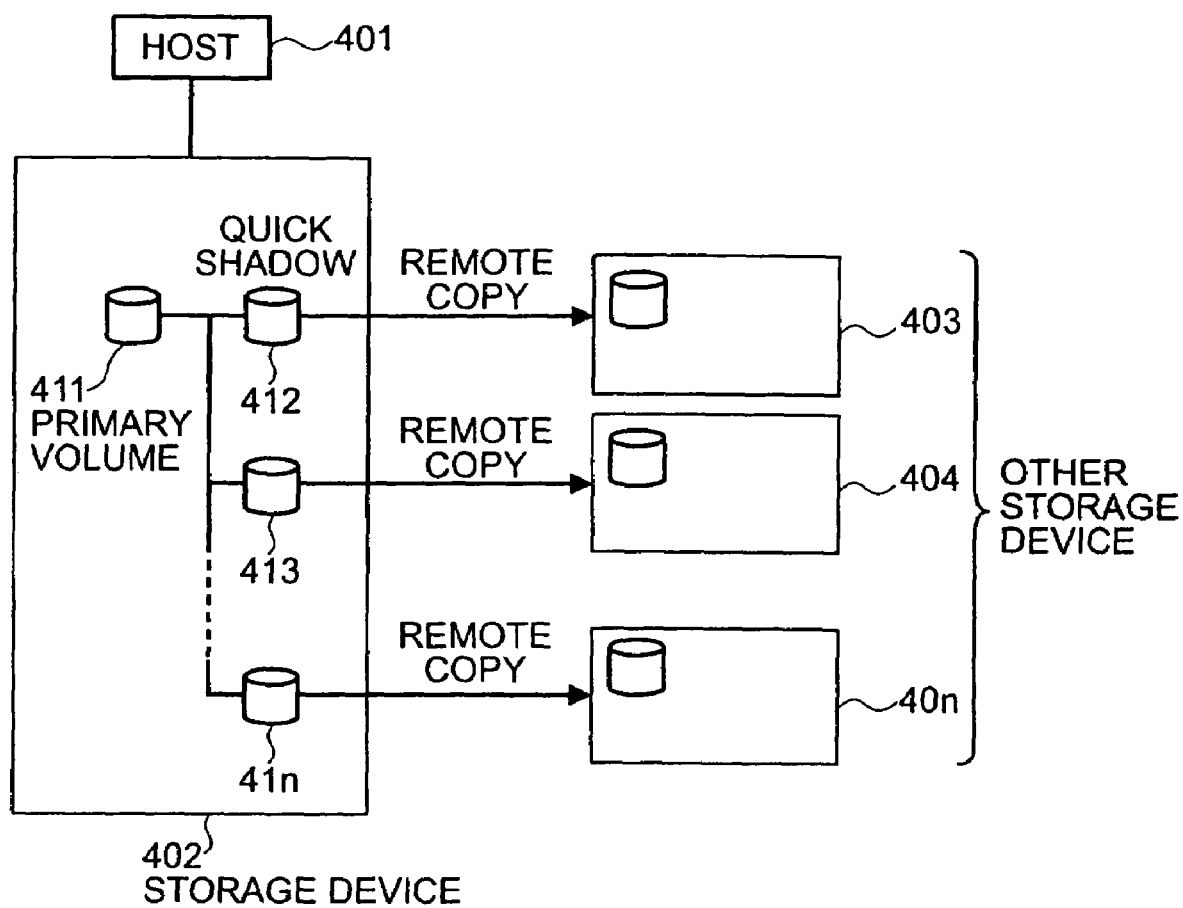
FIG. 3 is a diagram of remote copying according to the present invention.

Furthermore, in order to use this type of device to perform remote copies, a system such as shown in FIG. 3 is used. In FIG. 3, a storage device 402 connected to a host computer 401 is provided with primary volume 411 and a plurality of quick shadows 412, 413 . . . 41*n*. These quick shadows 412, 413 . . . 41*n* may be generated separately on specific days of the week, for example. Each of the quick shadows 412, 413 . . . 41*n* is provided with another storage device 403, 404 . . . 40*n*. The remote copies are stored into the other storage devices 403, 404 . . . 40*n*.

Figure 4:
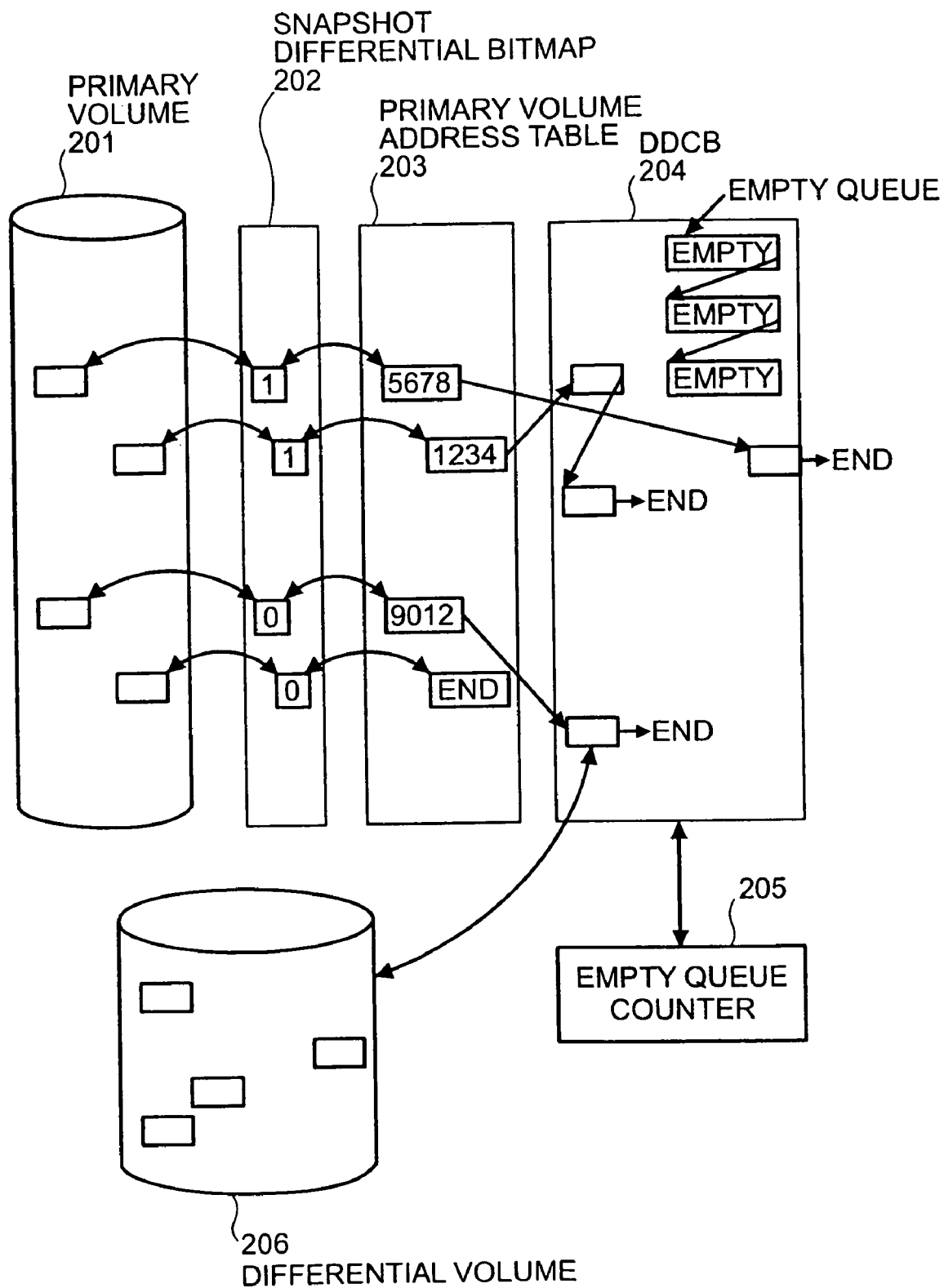
FIG. 4 is a diagram of a method of managing pool volume according to the present invention.

FIG. 4 is a diagram of a snapshot management method in accordance with the present embodiment. In FIG. 4, the primary volume 201 is a logical unit (P-VOL: Primary Volume), which is made available for normal operations, to and from which the data from the host 3 can be inputted or outputted.

A snapshot differential bitmap 202 is provided to a management area of the cache memory 107, and it has bits corresponding to the blocks in the primary volume 201 (where one block is 64 KB, for example). Then, in a case where the differential data corresponding to the block address in the primary volume 201 is recorded in the pool volume 206, the bit corresponding to the primary volume 201 in the snapshot differential bitmap 202 is "1". This snapshot differential bitmap 202 constitutes both a primary volume address table 203, which will be described below, along with the DDCB 204 and the snapshot management table.

Therefore, when writing to the primary volume 201, the snapshot differential bitmap 202 is referenced, whereby it can be determined whether or not it is necessary to copy the un-updated data into the pool volume. For example, if the bit is "1", then the data at the time of the snapshot generation request has already been written into the primary volume 206, so that it is not necessary to copy the data from the primary volume 201 into the pool volume 206.

Furthermore, the primary volume address table 203 has descriptions of whether or not the differential data exists for every 64 KB of the primary volume, and it has information about the position of the differential data. Therefore, it is provided to the management area of the cache memory 107, and it records the DDCB 204 address in correspondence with the bits of the snapshot differential bitmap 202.

The DDCB 204 is assigned to the pool volume in a one-to-one fashion, and it is provided in the management area of the cache memory 107. The DDCB 204 is divided for each block of the pool volume 206 (where one block is 64 KB, for example), and each division is provided with a management table. In the management table, it is possible to reference multiple generations of differential data by tracking the address that records which generation of snapshot data is for the differential data recorded in the position corresponding to the pool volume 206 block.

Note that, a link is set in the unused area of the DDCB 204, as an open queue. The capacity of the empty queue is managed by an empty queue counter 205 provided to the cache memory 107.

The pool volume 206 is constituted of a volume registered in the pool area. This pool volume 206 shows that the data in the primary volume 201 at the time when the snapshot was made was replicated logically. Then, a generation management bitmap of the DDCB 204 can be used to determine which generation of differential data is for the data in the pool volume 206.

Therefore, when writing the data into the primary volume, first, the snapshot differential bitmap 202 is referenced, and then a determination is made as to whether it is necessary to copy the un-updated data into the pool volume. If the corresponding bit in the snapshot differential bitmap 202 is "1", then it is determined that it is not necessary to copy the un-updated data into the pool volume, and so the data is written into the primary volume. On the other hand, if the corresponding bit in the snapshot differential bitmap 202 is "0", then the un-updated data is copied into the pool volume, and then the data is written into the primary volume.

Then, a link address for the newly set differential data is set in the DDCB 204 block that corresponds to the primary volume block. Then, the corresponding bit in the snapshot differential bitmap 202 is set to "1", and the DDCB 204 generation management bitmap, which corresponds to the address where the un-updated data in the pool volume 206 is written, is set. Then, when needed, the DDCB 204 block address is set in the primary volume address table 203.

Furthermore, the empty queue counter 205 is updated since the DDCB 204 empty queue was used.

Furthermore, when accessing the virtual volume (V-VOL: Virtual Volume), the primary volume address table 203 is referenced, and the virtual volume block address that will be accessed (which is equivalent to the primary volume block address) is used to identify the DDCB 204 address, and the generation management bitmap of the relevant address in the DDCB 204 is used to identify whether there is differential data for the generation that will be accessed.

If there is differential data for the desired generation, then the differential data is read out from the address of the pool volume 206 corresponding to the address of the relevant DDCB 204, and the image of the virtual volume is provided. On the other hand, if there is no differential data for the desired generation, then a link address to other differential data is referenced to search for the differential data of the desired generation. If neither differential data is for the desired generation, then the data currently recorded in the primary volume is provided as the data of the virtual volume.

Furthermore, in the above-mentioned construction, the actual data of the virtual volume created by the snapshot function exists in the pool volume that stores the primary volume and differential data of the snapshot. Therefore, when the remote copy is to be realized from the virtual volume, it is necessary to select the primary volume and the pool volume at the time when the remote copy is to be performed and then to execute the copy. Furthermore, when copying an area that is the same as the host interface, operations cannot take place at the same time as the interface.

Figure 5:
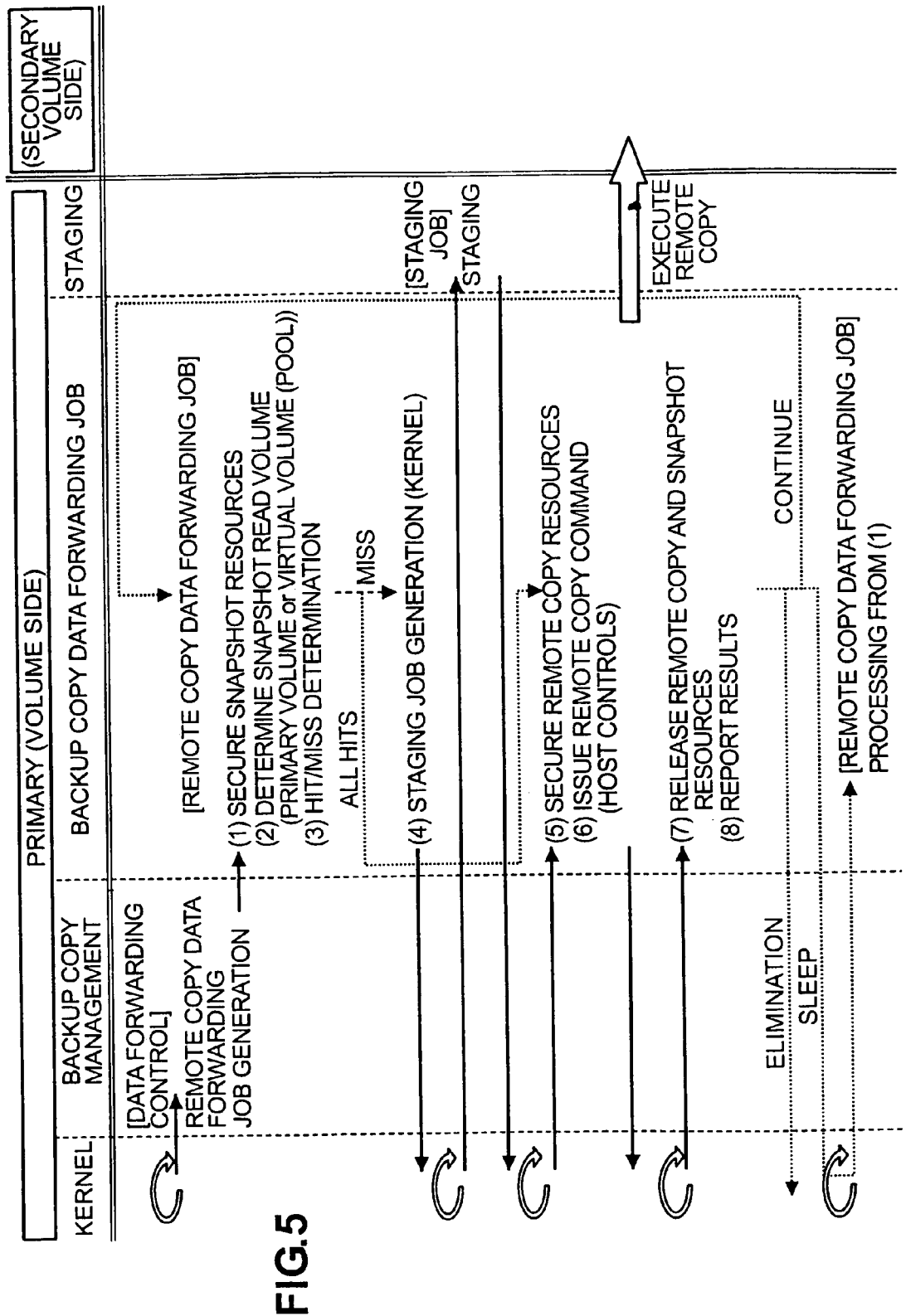
FIG. 5 is a process sequence diagram showing steps of data forwarding according to the present invention.

Therefore, the data forwarding processing is executed in a sequence such as shown in FIG. 5. Namely, as seen in FIG. 5, when instructions for the data forwarding controls are given from the kernel side to a remote copy managing section, a remote copy data forwarding job is generated. When the remote copy data forwarding job is performed, first, as step (1), snapshot resources are secured, and, as step (2), the snapshot read volume is determined (i.e., primary volume or virtual volume).

Then, as step (3), it is determined whether a hit or a miss occurred. If there was a miss here, then, as step (4), an instruction to generate a staging job is given to the kernel side. Accordingly, the staying job is executed as a function on the kernel side.

Furthermore, if all were hits at step (3), then, at step (5), the remote copy resources are secured, and, at step (6), a remote copy command is issued by the host side. Accordingly, the remote copy is written to the next volume side.

When the writing ends, at step (7), the resources used for the remote copy and the snapshot are released, and then, at step (8), results are reported. After that, the processing enters a sleep state, and, when a subsequent job is started, the processing is repeated from step (1).

The foregoing processing determines the address in the virtual volume where the subsequent copy will be performed based on the remote copy differential data, and it determines whether the virtual volume data is in the primary volume or the pool volume, based on the address and the snapshot function differential data. If the data is on the primary volume side, then, in order to accelerate the copy process, a large-size copy (in units of stripe columns) is performed, and pre-reading of the data is started, whereby the copy can be performed without waiting for the disk interface.

Furthermore, if the data is on the pool volume side, then the data is read out from the disk in 64-KB units since the differential used in the snapshot function is managed in 64-KB units, and then the copy is made to the backup copy side. Note that, when the data is on the pool volume side, the data is not normally arranged in a continuous fashion, so pre-reading of the data cannot be performed. Furthermore, when performing snapshot copying from the primary volume, there are cases where the same area as the host interface to the primary volume is accessed. Therefore, a lock is set on the copy range, and exclusion is performed with respect to the host interface.

In this way, when creating the remote copy in a storage device having the snapshot function, the remote copy can be created with good overall efficiency.

Figure 6:
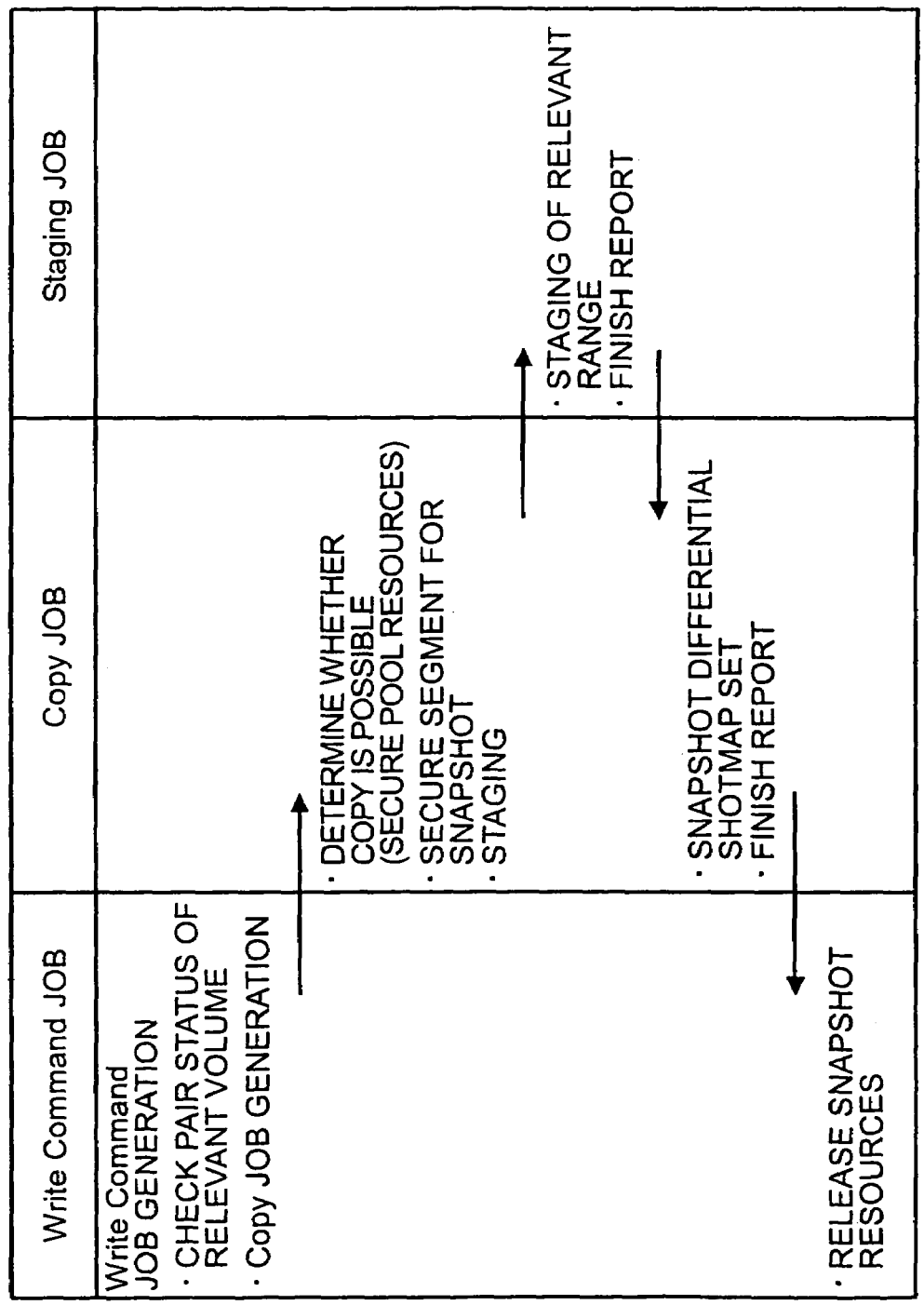
FIG. 6 is a process sequence diagram of write processing according to the present invention.

FIG. 6 shows a sequence for performing the write processing. In FIG. 6, first, a write command job is generated, and a check is performed here to verify the pair status of the volume where the data is to be written, and then the copy job is generated.

When the copy job is performed, in order to secure pool resources, a determination is made regarding whether the data written in the primary volume is right or wrong. Furthermore, a segment for the snapshot is secured and staging is performed. At this time, either a first bit map is created which shows the area where a differential has been developed with respect to the previously created remote copy, or a second bitmap is created which shows the area of the differential data.

Furthermore, when the staging job is performed, staging is executed with respect to the relevant range, and then completion thereof is reported. Again, in performing the copy job, the bits of the snapshot differential bitmap 202 that are already copied are turned on, and completion of the copy job is reported. Again, in performing the write command job, the status is sent and the resources used for the snapshot are released.

In the present device, it is necessary to manage the differentials from both the snapshot function and the remote copy function, respectively, but the differentials must be managed in a coordinated fashion. Furthermore, when performing the snapshot function, it is necessary to end the shift from the split status to the pair status instantaneously, but the snapshot function differential data which was set in the split state cannot easily be applied instantaneously to the remote copy differential data due to management-related reasons.

That is, in the device described above, in order to reduce the amount of data used for managing the differential produced in the remote copy mode, the differential is managed in 1 MB units. However, in the snapshot function, the differential is managed in units directly reflecting how the host performs, so the differential is managed in 64 KB units. This is because, in the snapshot function, even if the host interface involves 1 KB commands, the units of copies are generated in the units in which the differentials are managed upon each I/O performed to and from the host.

Furthermore, when the snapshot function is performed, the relationship between the primary volume and the virtual volume is 1:n. This complicates the management of the differential. Therefore, it is necessary to recognize the differential size that is mentioned above when setting the differential bit. Furthermore, when applying the differential data of the snapshot function to the differential data of the remote copy, it is necessary to end the processing instantaneously when the shift is made from the split status to the pair status. However, since the format of the differential data on the snapshot side is different, as described above, the differential data cannot be applied as it is to the remote copy side.

Therefore, in the device described above, the new differential data (i.e., a cascade differential having the same format as the original remote copy differential data)is created separately for the remote copy, and, when the snapshot differential is configured, the cascade differential of the remote copy is also set simultaneously. Accordingly, at the time of the shift from the split status to the pair status, the remote copy cascade differential is added to the remote copy differential data, thus enabling the processing to end instantaneously.

Specifically, as shown in FIG. 7A, much time is required for conversion processing to convert the snapshot data created for every 64 KB of the differential data into the first bitmap of the remote copy differential data created every 1 MB. In order to avoid this problem, this data conversion can be coordinated with the updating of the virtual logical volume, for example.

Furthermore, as shown FIG. 7B, when the snapshot function splits, at the time the snapshot data created for every 64 KB of the differential data is created, the second bitmap of cascade differential data, which is the new differential data, is created simultaneously. This second bitmap of cascade differential data is created in the same format as the first bitmap of differential data for the remote copy, which is created every 1 MB, as described above.

Then, as shown in FIG. 7C, when the snapshot function shifts from the split status to the pair status, the above-mentioned second bitmap of cascade differential data is added to the first bitmap of differential data for the remote copy (to produce a logical sum), and then the remote copy is created based on the bitmap thus added.

Figure 8:
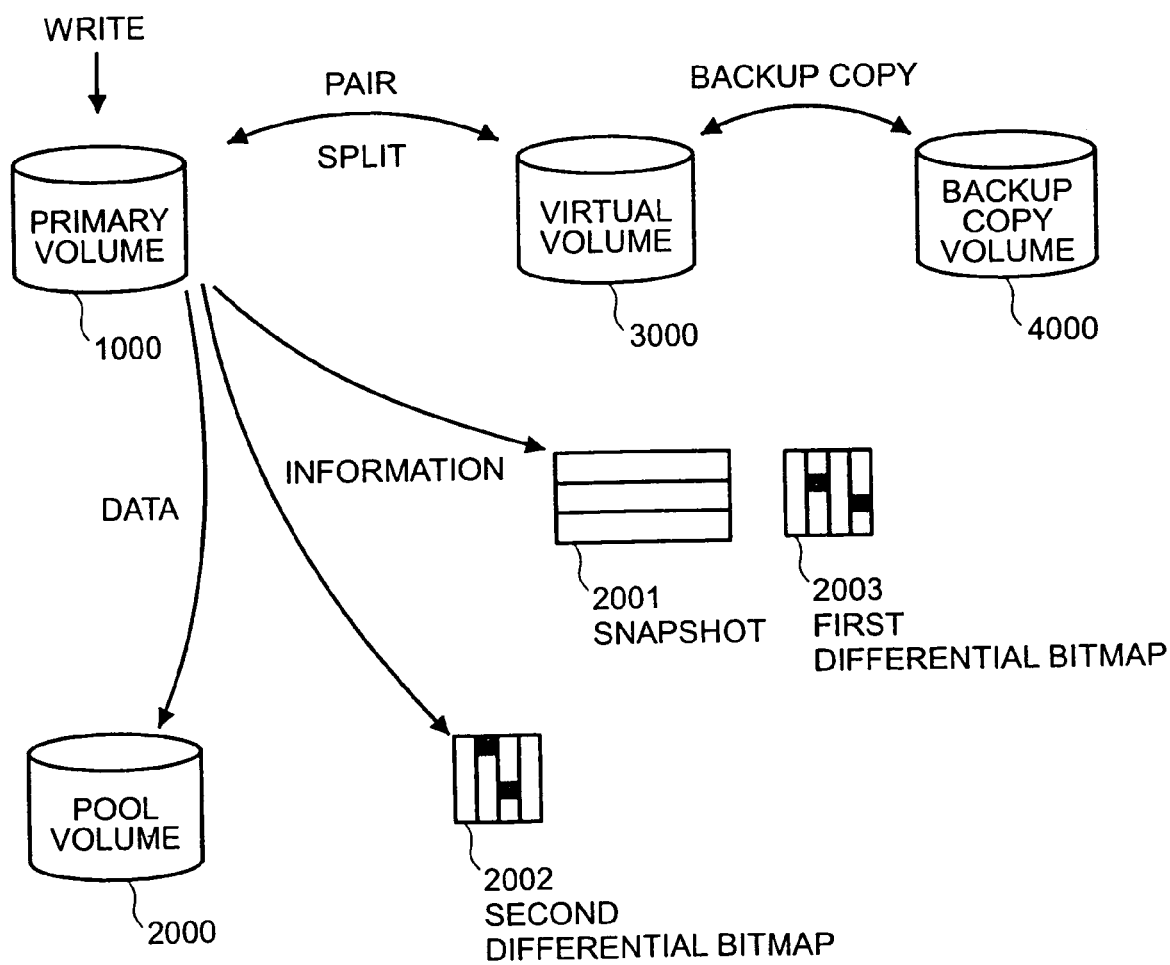
FIG. 8 is a diagram of write processing according to the present invention.

Using FIG. 8, explanation will now be given regarding actual processing of the present invention, with respect to the remote copying from one of the above-mentioned quick shadows in FIG. 3 to the other storage device. In FIG. 8, when data is written into primary volume 1000, data which was present there before the writing is transferred to pool volume 2000, and information thereof is stored in a storage section 2001 for the snapshot data. Simultaneously, the bitmap for the area where the differential occurred is created as a second bitmap 2002 of the cascade differential.

When the primary volume 1000 and virtual volume 3000 change from the split status to the pair status, information about the correspondence between the primary volume 1000 and the pool volume 2000 is stored into the virtual volume 3000, and the bitmap of the area where the differential occurred is added as a first bitmap 2003 of differential data. After the adding is performed, the information of the storage section 2001 with the snapshot data and the second bitmap 2002 of cascade differential are deleted.

Then, when creating the remote copy, the remote copying of the data into remote copy volume 4000 is performed based on the information of the first bitmap 2003 that was added. After this remote copying is performed, the information of the first bitmap 2003 is deleted.

Therefore, in the present embodiment, by creating the first bitmap showing the area with the differential with respect to the previously created remote copy, and the second bitmap showing the area with the differential data of the snapshot function, it becomes possible to perform efficient overall remote copying when creating a remote copy in the storage system having the snapshot function.

Accordingly, although the conventional device did not enable overall remote copying when creating a remote copy in the storage device having the snapshot function, in accordance with the present invention, the first bitmap and the second bitmap are created, and these bitmaps are used to create the remote copy efficiently, therefore solving the previously existing problems.

In the above-mentioned embodiment, the remote copy is updated using the data saved in the memory for the area indicated by the second bitmap. Therefore, the present invention can also be applied in a so-called storage device which is provided with a cache memory and which reports to the host computer that the writing is complete once the data is written into the cache memory.

Furthermore, in the embodiment described above, the second bitmap is provided only in the case of the configuration for making the remote copy. Therefore, for example, in a system where multiple units of virtual volume are provided, and each unit of virtual volume is used in sequential order for predetermined durations of time, the bitmaps of the differential data are not created for those durations of time when the virtual volume is not updated, whereby the overall storage capacity of the system can be increased.

Furthermore, the present invention is not restricted to the embodiment explained and described above, and various modifications can be made without departing from the spirit of the present invention.

The invention claimed is:

1. A storage device comprising:
   a host interface connected to a host device and receiving data from the host device;
   a memory connected to the host interface, and saving data exchanged with the host device, and control information relating to the data exchanged with the host device;
   a plurality of disk interfaces connected to the memory and performing control to read and write the data exchanged with the host device to and from the memory;
   a plurality of disk drives connected to the plurality of disk interfaces and storing data sent from the host device based on control of the plurality of disk interfaces; and
   a control processor for controlling reading and writing of data to and from a first logical volume generated using storage areas of the plurality of disk drives, performing control to write old data stored in the first logical volume into a second logical volume as per-generational differential data, and managing differential data by providing in an area of the memory a snapshot management table for managing the relationships of the per-generational differential data stored in the second logical volume,
   wherein the snapshot management table is used to generate a specific per-generational virtual logical volume, and the specific per-generational virtual logical volume is used to create a remote copy, and
   wherein differential data between said first logical volume and said specific per-generational virtual logical volume is sent to another storage device as data for the remote copy.

2. An information management system having a first storage device present at a first location and a second storage device present at a second location, wherein at least the first storage device is provided with:
   a host interface connected to a host device and receiving data from the host device;
   a memory connected to the host interface, and saving data exchanged with the host device and control information relating to the data exchanged with the host device
   a plurality of disk interfaces connected to the memory and performing control to read and write the data exchanged with the host device to and from the memory;
   a plurality of disk drives connected to the plurality of disk interfaces and storing data sent from the host device based on control of the plurality of disk interfaces; and
   a control processor for controlling reading and writing of data to and from a first logical volume generated using storage areas of the plurality of disk drives, performing control to write old data stored in the first logical volume into a second logical volume as per-generational differential data, and managing differential data by providing in an area of the memory a snapshot management table for managing relationships of the per-generational differential data stored in the second logical volume,
   wherein the snapshot management table is used to generate a specific per-generational virtual logical volume, and the specific per-generational virtual logical volume is used to create a remote copy in the second storage device, and
   wherein differential data between said first logical volume and said specific per-generational virtual logical volume is sent to another storage device as data for the remote copy.

* * * * *